United States Patent
Corretja et al.

(10) Patent No.: US 10,422,858 B2
(45) Date of Patent: Sep. 24, 2019

(54) METHODS FOR OPTIMIZING THE DETECTION OF MARINE TARGETS AND AIRBORNE RADAR IMPLEMENTING SUCH A METHOD

(71) Applicant: THALES, Courbevoie (FR)

(72) Inventors: Vincent Corretja, Pessac (FR); Gilles Guerrini, Pessac (FR); Thierry Sfez, Elancourt (FR); Richard Montigny, Pessac (FR); Stéphane Kemkemian, Elancourt (FR); Jean-Marc Chabroux, Elancourt (FR)

(73) Assignee: THALES, Courbevoie (FR)

( * ) Notice: Subject to any disclaimer, the term of this patent is extended or adjusted under 35 U.S.C. 154(b) by 300 days.

(21) Appl. No.: 15/491,871

(22) Filed: Apr. 19, 2017

(65) Prior Publication Data

US 2017/0315216 A1  Nov. 2, 2017

(30) Foreign Application Priority Data

Apr. 29, 2016 (FR) ...................................... 16 00714

(51) Int. Cl.
*G01S 7/41* (2006.01)
*G01S 7/292* (2006.01)
(Continued)

(52) U.S. Cl.
CPC .............. *G01S 7/414* (2013.01); *G01S 7/292* (2013.01); *G01S 7/4026* (2013.01);
(Continued)

(58) Field of Classification Search
CPC ........ G01S 13/103; G01S 13/52; G01S 7/292; G01S 7/4026; G01S 7/414; G05D 1/0094;
(Continued)

(56) References Cited

U.S. PATENT DOCUMENTS

| 4,034,373 A * | 7/1977 | de Pierre ................ G01S 13/53 342/100 |
| 2011/0102247 A1* | 5/2011 | Pauli ..................... G01S 7/2927 342/159 |

(Continued)

OTHER PUBLICATIONS

Stephane Kemkemian et al., "Slow and Small Target Detection in High Sea States Thales Airborne Systems," Jun. 26, 2015, XP055329541. <http://ieeexplore.ieee.org/ielx7/7209173/7226207/7226300.pdf>.

(Continued)

*Primary Examiner* — Timothy X Pham
(74) *Attorney, Agent, or Firm* — Baker & Hostetler LLP (57) ABSTRACT

A detection method for a given mission comprises: a phase of analyzing the environment, wherein phase elements of influence on the sea clutter perceived by the radar are sought and stored in memory; a phase of updating the path to be followed by the carrier depending on the requirements of the mission and the elements of influence issued from the result of the analyzing phase, the path to be followed decreasing the power of the clutter received by the radar when the antenna is pointing towards a search zone liable to contain a target; the phases being repeated throughout the mission.

10 Claims, 5 Drawing Sheets

(51) Int. Cl.
*G01S 13/10* (2006.01)
*G01S 13/52* (2006.01)
*G01S 7/40* (2006.01)
*G08G 3/00* (2006.01)
*G08G 5/00* (2006.01)
*G05D 1/00* (2006.01)

(52) U.S. Cl.
CPC ............ *G01S 13/103* (2013.01); *G01S 13/52* (2013.01); *G05D 1/0094* (2013.01); *G08G 3/00* (2013.01); *G08G 5/0013* (2013.01); *G08G 5/0021* (2013.01); *G08G 5/0056* (2013.01)

(58) Field of Classification Search
CPC ...... G08G 3/00; G08G 5/0013; G08G 5/0021; G08G 5/0056
USPC .......................................................... 342/159
See application file for complete search history.

(56) References Cited

U.S. PATENT DOCUMENTS

| | | | |
|---|---|---|---|
| 2011/0134412 A1* | 6/2011 | Inokuchi | G01S 17/58 356/28.5 |
| 2012/0127025 A1* | 5/2012 | Bon | G01S 13/53 342/149 |
| 2012/0154204 A1* | 6/2012 | Wood | G01S 7/34 342/159 |
| 2013/0166113 A1* | 6/2013 | Dakin | G01N 21/53 701/10 |
| 2014/0266899 A1* | 9/2014 | Torre | G01S 13/24 342/371 |
| 2017/0102459 A1* | 4/2017 | Sakamoto | G01S 13/584 |
| 2018/0052224 A1* | 2/2018 | Bretschneider | G01S 7/414 |

OTHER PUBLICATIONS

Yong Yang et al., "Modelling and simulation of spatial-temporal correlated distributed clutter for coherent radar seeker," IET Radar Sonar Navigation, The Institution of Engineering and Technology, vol. 8, No. 1, Jan. 1, 2014, pp. 1-8, XP006048084.

Peng-Lang Shui et al., "Subband Adaptive GLTR-LTD for Weak Moving Targets in Sea Clutter," IEEE Transactions on Aerospace and Electronic Systems, vol. 52, No. 1, Feb. 1, 2016, pp. 423-437, XP011604932.

Dong-Chen Li et al., "Floating small target detection in sea clutter via normalised Doppler power spectrum," IET Radar Sonar Navigation, The Institution of Engineering and Technology, vol. 10, No. 4, Apr. 1, 2016, pp. 699-706, XP006055802.

* cited by examiner

METHODS FOR OPTIMIZING THE DETECTION OF MARINE TARGETS AND AIRBORNE RADAR IMPLEMENTING SUCH A METHOD

CROSS-REFERENCE TO RELATED APPLICATIONS

This application claims priority to foreign French patent application No. FR 1600714, filed on Apr. 29, 2016, the disclosure of which is incorporated by reference in its entirety.

FIELD OF THE INVENTION

The present invention relates to a method for optimizing the detection of targets by an airborne radar. It also relates to a radar implementing such a method.

BACKGROUND

In the context of maritime surveillance, in particular during sea rescue operations, the mission of an airborne radar is to detect marine targets. To perform this mission, the radar captures the signal backscattered by the targets. However, the signal also captures a disruptive signal backscattered by the sea, called clutter or sea clutter. The position and intensity of the clutter zone vary depending on the state of the sea and in particular placement with respect to the wind, and the precise conditions of detection are unknown beforehand.

Currently, for an airborne surveillance radar, the operator determines on his own the path of the carrier of the radar without taking into account optimization of the detection processing operations. This solution in particular has the following drawbacks:

The detection performance of the radar is not the maximum achievable performance;

If he decides to take into account parameters allowing the detection processing operations to be optimized as a criteria when determining his path, the operator is not assisted in this by the radar. This leads to yet other drawbacks:

The operator has to spend a substantial amount of time analysing the weather or sea environment and choosing the optimal navigation law;

The operator must, to make this choice judiciously, have on the one hand been trained and on the other hand acquired a solid experience;

The operator makes the choice of the path depending on his own perception and evaluation of the environment, often enriched by knowledge of meteorological information, however this evaluation may be limited in precision and may not correspond to that perceived by the radar during its detection processing.

SUMMARY OF THE INVENTION

The aim of the invention is to mitigate the aforementioned drawbacks, in particular by providing, automatically, a law allowing the carrier to be navigated so as to maximize the probability of success of an operational mission. For this purpose, one subject of the invention is a method for optimizing the detection of marine targets by an airborne radar integrated into a carrier, the detection being done for a given mission, said method including:

A phase of analysing, learning and refreshing the environment, in which phase elements of influence on the sea clutter perceived by the radar are sought and stored in memory;

A phase of updating the path to be followed by the carrier depending on the requirements of said mission and said elements of influence issued from the result of said analysing phase, said path to be followed decreasing the power of the clutter received by the radar when said antenna is pointing towards a search zone liable to contain a target;

said phases being repeated throughout said mission.

One element of influence being the direction in which the antenna of said radar is pointing with respect to the wind direction, said wind direction is determined by detecting the direction in which the power of the signal backscattered by the sea is maximum during said phase of analysing the environment.

In one particular implementation, said analysing phase is performed in each scanning cycle, said updating phase also being performed in each scanning cycle.

One element of influence being the direction in which the antenna of said radar is pointing with respect to the wind direction, and the detection mode being non-coherent, said path to be followed for example depends on said element of influence and whether said search zone, with respect to the course of the carrier, is located in front, to the rear or perpendicularly.

One element of influence being the clutter-to-noise ratio and the detection mode being non-coherent, said path to be followed for example depends on said ratio, said path being deviated to another course when said ratio exceeds a given threshold.

Elements of influence being the bearing of the antenna and the direction in which the antenna of said radar is pointing with respect to the wind direction, and the detection mode being coherent, said path to be followed is for example perpendicular to the wind direction in the case where the mission is to detect a target assumed to be mobile, and parallel to the wind direction in the case where the mission is to detect a target assumed to be immobile.

After said phase of analysing the environment, the processing means for example update and store in memory a map of the wind, the updated path to be followed also being stored in memory.

Said path to be followed, updated, is for example transmitted to an operator by said radar via suitable means.

Said mission is for example a maritime patrol or maritime surveillance mission, in particular a sea rescue mission.

Another subject of the invention is a radar implementing a method such as described above.

BRIEF DESCRIPTION OF THE DRAWINGS

Other features and advantages of the invention will become apparent by virtue of the following description, which is given with reference to the appended drawings, which show.

DETAILED DESCRIPTION

Figure 1:
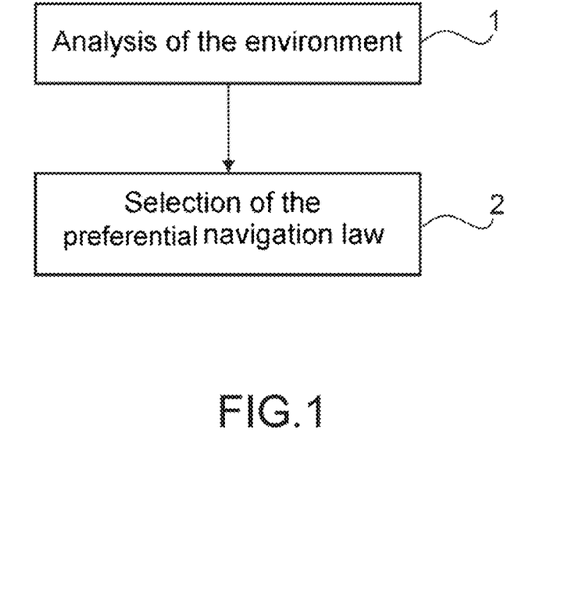
FIG. 1, an illustration of the principle of the method according to the invention.

FIG. 1 illustrates the principle of the method according to the invention. In a phase 1 of environment analysis, the airborne radar analyses in real time its environment over its entire detection domain, then, in a second phase 2, depending on the result of its analysis and on the operational mission, it automatically generates an optimal navigation law, i.e. the law that maximizes the probability of detection, for each zone of its detection domain.

In this context, it evaluates the properties of the sea clutter in the zones that are of interest with regard to the operational requirements in order to deduce therefrom the optimal path.

Depending on processing characteristics and whether the mode is coherent or non-coherent, elements of influence affect the detection of targets in the presence of sea clutter, the clutter power being a critical factor in radar detection of maritime targets. The path to be followed is in particular calculated depending on these elements of influence.

The influences in the case of coherent processing will now be broached. In this case, the elements of influence are in particular the bearing of the antenna and the direction in which the antenna is pointing with respect to the wind. To demonstrate these influences, the Doppler spectrum of samples of sea clutter is modelled.

It is known that the direction $\phi$ in which the antenna is pointing with respect to the wind has an influence on the Doppler frequency $\bar{f}$ and therefore on the shift of the Doppler spectrum.

Figure 2A:
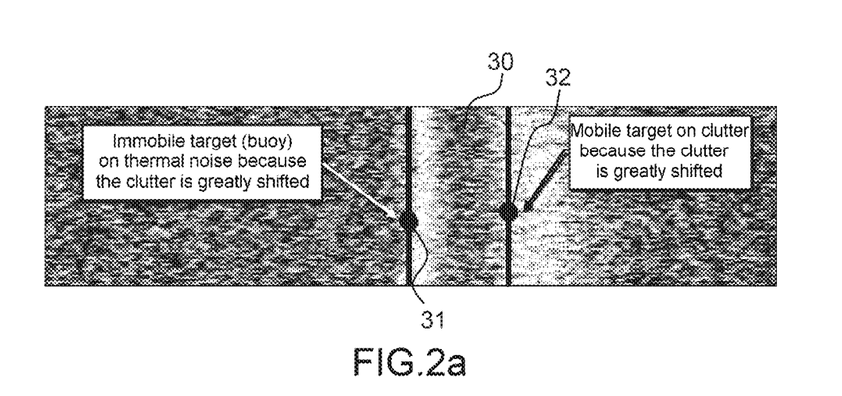
FIGS. 2a and 2b, an illustration of the Doppler spectrum shift and the Doppler spectrum centred on zero, respectively.

Thus, if $\phi$ is close to 0 modulo 180°, the Doppler spectrum of the sea clutter is shifted as illustrated in FIG. 2a. By way of example, an immobile target 31, for example a buoy anchored to the seabed, and therefore of zero velocity, is detected on thermal noise because the clutter 30 is greatly shifted. A mobile target 32 is on clutter because the clutter is greatly shifted. In such a situation, it is then easy to detect in the thermal noise of the radar an immobile target the spectrum of which is centred on 0.

Figure 2B:
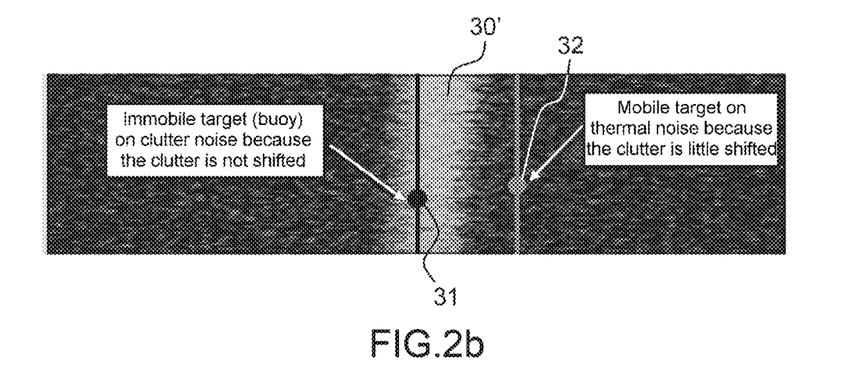

In contrast, if $\phi$ is close to 90° modulo 180°, the Doppler spectrum of the sea clutter is centred on zero as illustrated in FIG. 2b. An immobile target 31, for example a buoy, is on clutter 30 because the clutter is not shifted. A mobile target 32 is on thermal noise because the clutter is little shifted. In such a situation, it is then easy to detect in the thermal noise of the radar a mobile target the spectrum of which is not centred on 0, but it becomes difficult to detect an immobile target.

It is also known that the bearing of the antenna has a direct influence on the width of the Doppler spectrum of the sea clutter.

Specifically, the greater the bearing of the antenna, the greater the standard deviation of the antenna and therefore the greater the width of the spectrum. However, the wider the spectrum, the more difficult it is to detect a target located in this spectrum.

It would therefore appear that in the case of coherent processing it is possible to distinguish at least two elements of influence: the direction in which the antenna is pointing with respect to the wind, which is defined by the angle $\phi$, and the bearing of the antenna. The first element influences the shift of the spectrum whereas the second affects the width of the spectrum.

As regards the shift of the Doppler spectrum, there is then a dependency on the type of target sought:

if the sought target is immobile, it is advantageous to have the direction $\phi$ in which the antenna is pointing close to 0 modulo 180°, in order to shift the Doppler spectrum;

in contrast, if the sought a target is immobile, it is more advantageous to have the Doppler spectrum centred on 0 and therefore to have the pointing direction $\phi$ close to 90° modulo 180°. If the sign of the radial velocity of the target is known beforehand, it is possible to privilege an opposite shift of the Doppler spectrum: for example for a positive radial target velocity, an angle $\phi$ close to 180° is chosen.

The invention advantageously allows a preferential navigation law to be selected depending on the mission context. In particular a device according to the invention is able to deliver an optimal navigation law in order to maximize the probability of detection of a target in a maritime environment.

At the start of the mission, an operator chooses the minimum RCS of the targets that he wants to detect, the zone to be searched for the one or more targets and the non-coherent or coherent processing mode.

If the minimum accessible RCS is smaller than that indicated by the operator in the chosen search zone, then a message transmitted by the device for example indicates that the current configuration is usable. In the contrary case, a suggestion is made regarding the direction of the carrier, in order to allow the situation of the latter to be improved so that it will be able to detect targets with the desired RCS in the indicated zone.

The preferential direction that the carrier must take is determined depending on the operational requirements, which define the detection processing mode chosen.

In the case of processing in a non-coherent mode, the determining factors are the power of the clutter and the configuration of the carrier with respect to the wind. To limit the power of the clutter and to optimize the search for targets, a plurality of carrier configurations are taken into account in particular depending on the azimuth of the search zone with respect to the course of the carrier and/or the wind direction with respect to the carrier.

Figure 3:
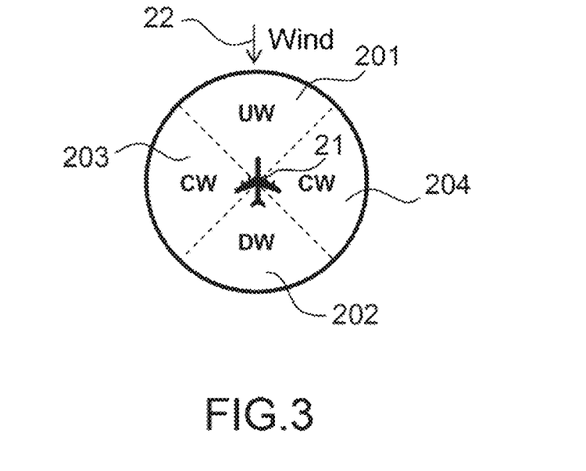
FIG. 3, an example of a carrier 21 configuration dependent on wind direction 22.

FIG. 3 illustrates an example of a carrier 21 configuration dependent on wind direction 22. In this example, the aircraft 21 bearing the radar is heading upwind. In order to characterize the configuration of the carrier with respect to the wind, the zone around the carrier is divided into four equal portions. A first zonal portion 201, called the upwind (UW) portion, characterizes the movement of the carrier when the antenna beam is directed upwind or mainly upwind. A second portion 202, called the downwind (DW) portion, opposite the preceding portion, describes a portion in which the antenna beam is directed downwind, or mainly downwind. Lastly, the two last portions 203, 204, which are called the crosswind (CW) portions, correspond to the case where the antenna beam is directed perpendicularly or mainly perpendicularly to the wind direction.

Depending on the direction in which the antenna is pointing with respect to the wind, the contribution of the waves to the sea clutter is different.

Thus the upwind (UW) configuration is the least favourable to the detection of targets. Specifically, in this configuration the radar cross section (RCS) of the wave crests is larger and therefore the power of the sea clutter also. In contrast, in the downwind (DW) configuration, the contribution of the wind is the smallest. In the crosswind (CW) configuration, the power of the sea clutter is lower than in the upwind configuration but higher than in the downwind configuration.

Thus, in the case of non-coherent processing, two elements of influence may be distinguished: the power of the clutter and the configuration of the antenna with respect to the wind.

If the power of the clutter is too high in the distance slots corresponding to the search zone (case of a large RCS), detection is difficult or even impossible. Furthermore, if the carrier is in a poor configuration with respect to the wind, in the upwind configuration for example, the detection of a target is even more difficult.

It may therefore be advantageous to suggest a carrier path in order to operate in a better configuration, with a lower clutter power.

Figure 4:
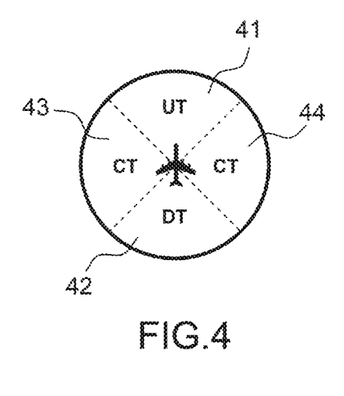
FIG. 4, a carrier configuration dependent on the azimuth of the target search zone.

FIG. 4 illustrates a carrier configuration dependent on the azimuth of the target search zone. In this configuration, three possible cases are considered:

the search zone 41 is in front of the carrier, called the uptarget (UT) configuration;
the search zone 42 is behind the carrier, called the downtarget (DT) configuration;
the search zone 43, 44 is perpendicular to the carrier, called the crosstarget (CT) configuration.

The azimuthal space is in fact divided into four equal search zones 41, 42, 43, 44 each of which is centred on an axis. The axes of the front 41 and rear 42 zones are coincident with the axis of the carrier, and the axes of the perpendicular zones 43, 44 are perpendicular to the axis of the carrier.

Figure 5:
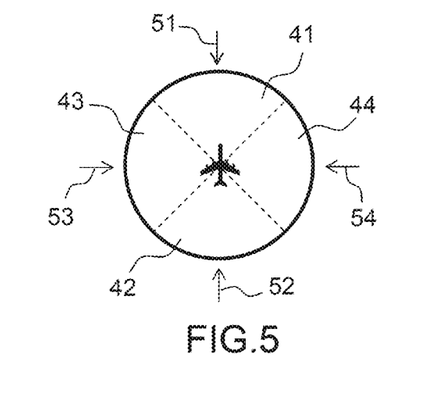
FIG. 5, an illustration of the wind direction with respect to the carrier of the radar.

FIG. 5 illustrates the wind direction with respect to the carrier. Four cases are considered:

Headwind (straight-on), wind 51 from the north in the example in FIG. 5;
Tailwind, wind 52 from the south in the example in FIG. 5;
Wind from the left (port-side), wind 53 from the west in the example in FIG. 5;
Wind from the right (starboard-side), wind 54 from the east in the example in FIG. 5.

The wind direction influences the configuration of the carrier which may then, with reference to FIG. 3, be in an upwind, downwind or crosswind configuration.

Thus, by taking into account the possible configurations of FIGS. 4 and 5, the carrier may be in 3×4=12 different configurations. For each of these configurations, the ideal path that the carrier must take in order to minimize the power of the clutter in the search zone 41, 42, 43, 44 is determined.

The following criteria are taken into account in the determination of the ideal path:
configuration with respect to the wind;
distance between the targeted zone and the carrier.

Below, by way of example, the solution according to the invention is illustrated while considering only the criterion on the configuration with respect to the wind.

FIGS. 6a, 6b, 6c and 6d successively show, depending on the orientation of the wind with respect to the carrier, the twelve different configurations and the choice made with respect to the direction in which the carrier must go for each configuration. For all these configurations, the carrier is represented heading northwards at the time shown.

Figure 6A:
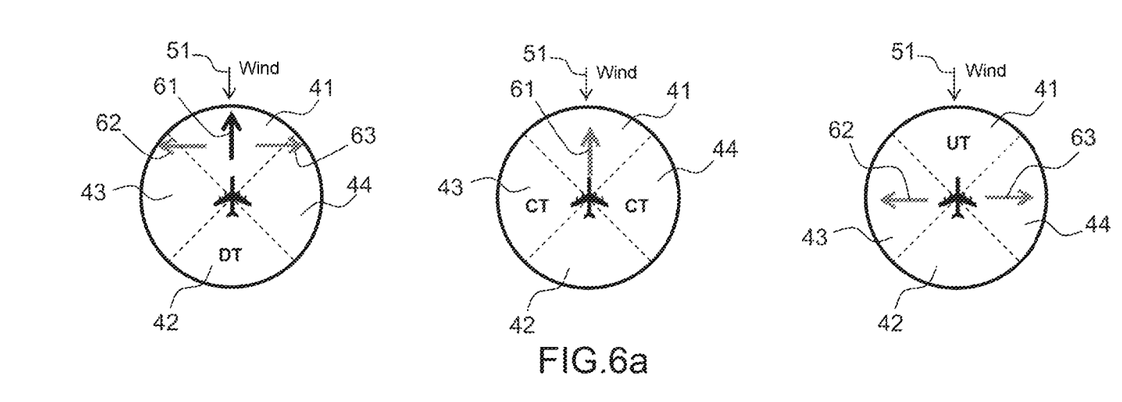
FIGS. 6a to 6d, successively, depending on the orientation of the wind with respect to the carrier, the 12 different carrier/target/wind configurations and the associated choice of path.

FIG. 6a illustrates the choice of path for the carrier depending on the target search azimuth with a wind direction 51 coming from the north. The four zones 41, 42, 43, 44 centred on axes spaced apart azimuthally by 90° are again shown. FIG. 6a therefore shows in succession the three possible configurations, DT, CT and UT, with the wind coming from the north.

The direction of the path proposed to an operator is shown by an arrow. For each of these configurations, the path proposed to the operator places the carrier in the best configuration with respect to the wind, i.e. the configuration with a lower power. The proposed paths are defined below:

In the case where the search zone 42 is behind (DT), the antenna beam being directed towards this zone, the clutter power is minimum when the antenna beam is directed downwind, the carrier therefore continues its path upwind, nevertheless if the carrier moves away from the zone of this search zone 42, a perpendicular crosswind path 62, 63 is proposed;

In the case where the search zone 42, 43 is perpendicular (CT), the proposed direction 61 is upwind, because this is the direction that decreases the power of the clutter on account of the direction of the antenna beam which is oriented towards this crosswind zone 42, 43;

In the case where the search zone 41 is in front (UT), the antenna beam necessarily directed towards this zone is upwind if the carrier continues in the upwind direction, this being the least favourable case since the power of the clutter is then maximum. There is therefore no chance of detecting a target, for example a lifeboat, in this direction. It is therefore proposed that the carrier take a crosswind path direction 62, 63 perpendicular to the wind to decrease the clutter power.

Figure 6B:
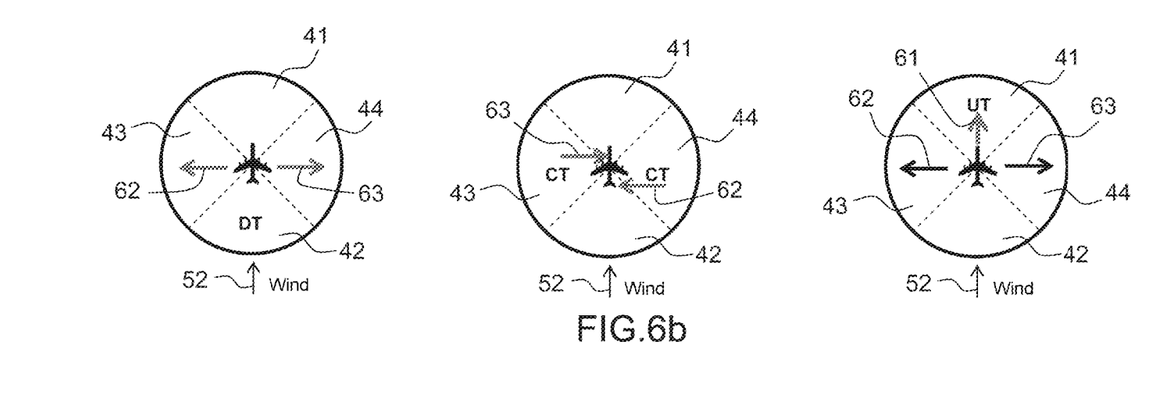

FIG. 6b illustrates the choice of path of the carrier depending on the target search azimuth with a wind direction 52 coming from the south, for the three possible configurations DT, CT and UT:

In the case where the search zone 42 is behind (DT), the clutter power is maximum in this zone if the beam remains directed upwind 52, therefore it is proposed that the carrier take a perpendicular crosswind direction 62, 63;

In the case where the search zone 42, 43 is perpendicular (CT), the proposed direction 61 is that which the carrier is following, upwind, because this is the direction that minimizes the power of the clutter (crosswind);

In the case where the search zone 41 is in front (UT), the carrier may continue in this direction with the wind behind, the antenna beam being directed towards the downwind zone 41, because the power of the clutter is then minimum. A perpendicular path direction 62, 63 may be proposed if the carrier is close to the crosswind search zone.

Figure 6C:
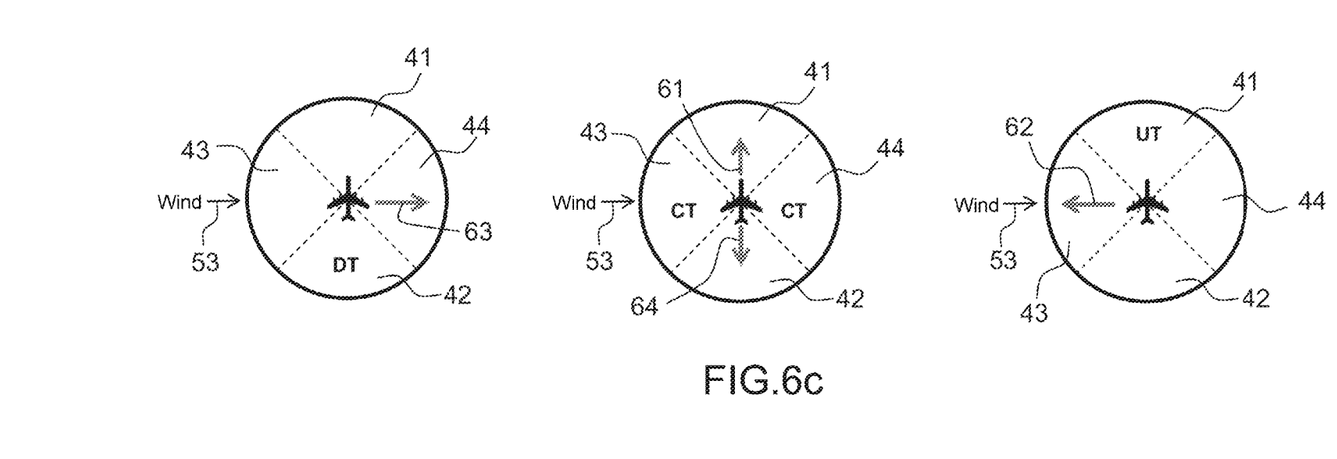

FIG. 6c illustrates the choice of path of the carrier depending on the target search azimuth with a wind direction 53 coming from the west, for the three possible configurations, DT, CT and UT:

In the case where the search zone 42 is behind (DT), the clutter power is decreased by directing the carrier in the downwind perpendicular direction 63;

In the case where the search zone 42, 43 is perpendicular (CT), the direction proposed to the carrier is that 61 that it is following or the opposite direction 64;

In the case where the search zone 41 is in front (UT), the clutter power is decreased by directing the carrier in the upwind perpendicular direction 62.

Figure 6D:
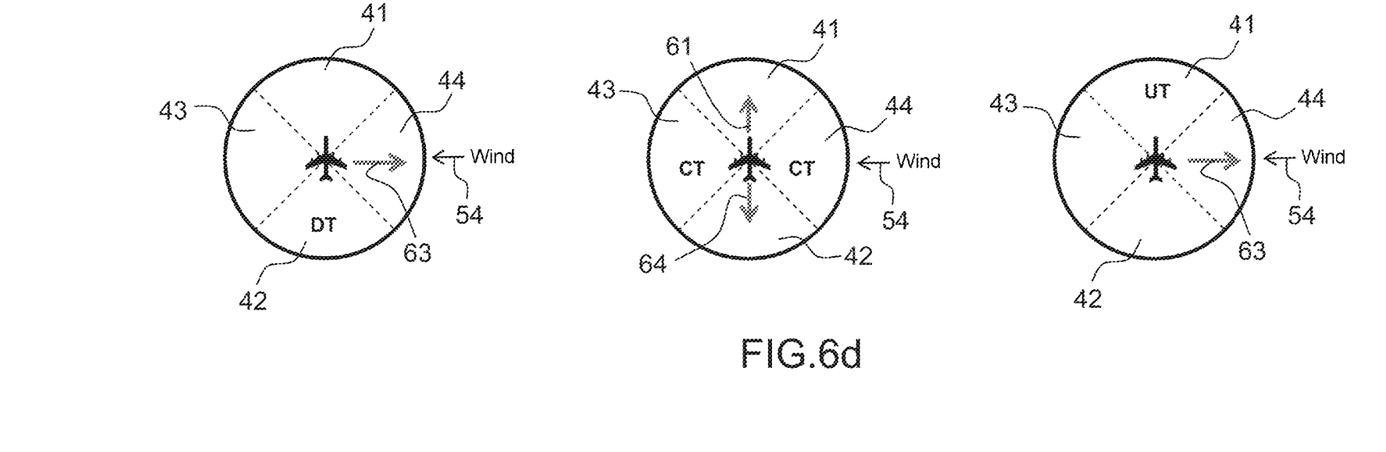

FIG. 6d illustrates the choice of path of the carrier depending on the target search azimuth with a wind direction 54 from the east, for the three possible configurations, DT, CT and UT:

In the case where the search zone 42 is behind (DT), the clutter power is decreased by directing the carrier in the upwind perpendicular direction 63;

In the case where the search zone 42, 43 is perpendicular (CT), the direction proposed to the carrier is that 61 that it is following or the opposite direction 64;

In the case where the search zone 41 is in front (UT), the clutter power is decreased by directing the carrier in the upwind perpendicular direction 63.

In the case of processing in a coherent mode, the determining factors are the bearing of the antenna for the width of the Doppler spectrum and the direction in which the antenna is pointing with respect to the wind for the shift of the Doppler spectrum. To minimize the width of the Doppler spectrum, it is necessary for the antenna bearing to be zero. Thus the direction in which the antenna must be pointed with respect to the wind becomes:

$$\phi = \text{carrier\_course} + \text{wind\_azimuth} \quad (1)$$

Thus, depending on whether it is desired to detect mobile targets or immobile targets, the choice of path may be narrowed down to the following cases:

Detection of mobile targets: the Doppler spectrum must be centred on 0 and it is therefore necessary for $\phi$ to be close to 90° modulo 180°. According to relationship (1), this therefore amounts to having the carrier perpendicular to the wind direction.

If the sign of the radial velocity of the target is known beforehand, an opposite shift of the Doppler spectrum is privileged. For example, for a positive radial target velocity, an angle $\phi$ of close to 180° is chosen.

Detection of immobile targets: the Doppler spectrum must be shifted. It is therefore necessary for to be close to 0 modulo 180°. According to relationship (1), this therefore amounts to having the carrier parallel to the wind direction.

Figure 7A:
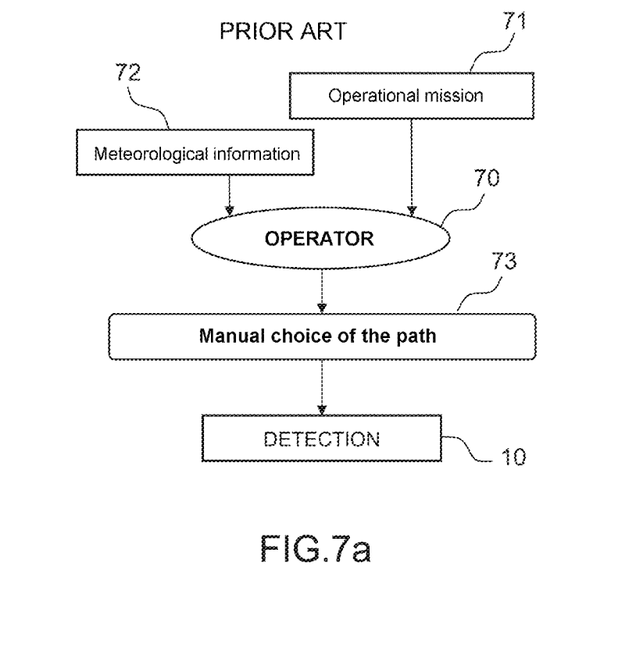
FIGS. 7a and 7b, a method for detecting maritime targets according to the prior art and the detecting method according to the invention, respectively.
Figure 7B:
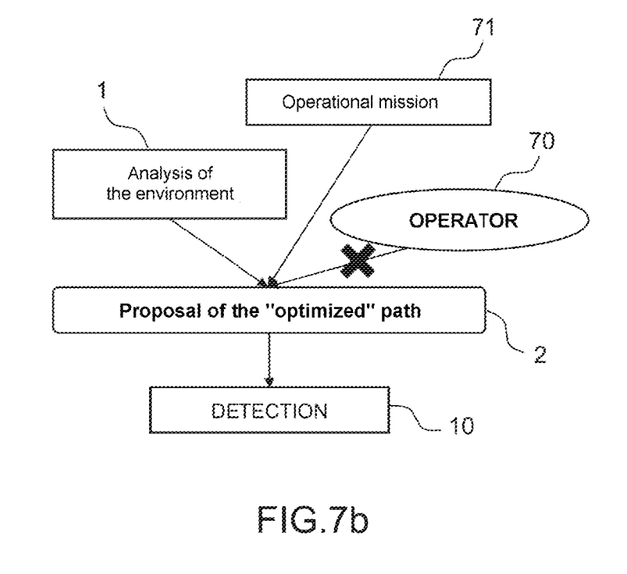

FIGS. 7a and 7b illustrate a method for detecting maritime targets according to the prior art and the detecting method according to the invention, respectively. FIG. 7b illustrates the steps to take to make path selections such as described above, in order to optimize the detection processing of maritime targets. FIG. 7a recalls the prior art, and in particular the role of the operator.

In a prior-art solution an operator 70 receives mission information 71 and meteorological information. An example of an operational mission 71 is for example the search for a lifeboat in a given maritime zone. The operator 70 manually chooses 73 the path of the carrier aircraft depending on the mission and meteorological information available to him. The radar, placed below the aircraft, performs the detection operations 10 in the detection context defined by the chosen path.

In a device according to the invention, the operator 70 no longer takes part in the choice of the path, a path is automatically proposed depending on the operational mission 71 and the environment.

A radar implementing the method according to the invention includes means able to carry out the analysis 1 of the environment, on the basis of external data delivered to the radar or captured thereby. The analysis of the environment is for example refreshed at a sufficiently high rate, given the variation in the external conditions (wind, state of the sea, weather, etc.) and the movement of the platform with respect to the zone of interest. In a refresh, only the zone covered by the angular scanning domain of the antenna is refreshed. This may be directly the entirety of the 360° of azimuth or a more restricted angular sector. The scanned angular sector is defined in the platform coordinate system: it is therefore possible to take advantage of movements of the platform to refresh the situation outside of the instantaneous zone of coverage. The phase 1 of analysing the environment and the phase 2 of selecting the path are implemented by the processing means of the radar according to the invention. It is not necessary to provide additional components or hardware, since the invention can be implemented with the conventional means of an airborne radar.

The environmental analysis in particular comprises determining the wind direction. On the basis of this direction and taking into account the search zone defined by the mission, the processing means of the radar calculate the path to be followed 2 in accordance with the rules described with reference to FIGS. 6a, 6b, 6c and 6d, when the radar is operating in a non-coherent mode.

The wind direction may be determined by estimating the direction in which the power of the signal backscattered by the sea is highest, this direction indicating the wind direction. The wind direction may be determined from a single analysis of 360° around the carrier, or of the entirety of the area probed by the radar. After the phase 1 of analysing the environment, the processing means update the environmental data and in particular the wind direction. A map of the wind is for example stored in memory and enriched over time. In parallel, the path to be followed is stored in memory and updated. This path to be followed is the selected path that allows the detection to be optimized. As described in FIGS. 6a to 6d, knowledge of the wind direction and of the search zone with respect to the carrier allows an optimal path to be selected. This path to be followed is transmitted to the pilot via suitable means. In the case where the carrier is a drone for example, the operator is the autopilot.

Another factor of influence when determining the path to be followed is the clutter-to-noise ratio, in practice the power of the sea clutter. In particular, if the power of the clutter is too high in distance slots corresponding to the search zone, corresponding to a high CNR, the detection may be impossible, and a change of direction is proposed to obtain a lower CNR.

The wind direction is also useful when determining the path in coherent mode. Specifically, in this case, not only is the direction in which the antenna of the radar is pointing with respect to the wind an element of influence but so is the bearing of the antenna as was shown above. To determine the path, it is also necessary to take into account the fact that the targets are either mobile or immobile. This target mobility information is given by the mission. The processing means of the radar generate the path in real time, as the antenna is turning, while taking into account this information, the path being perpendicular or parallel to the wind depending on the circumstances, as indicated above.

The invention advantageously allows the probability of success of an operational air-sea search and rescue mission to be maximized by maximizing the probability of detection. The invention provides the detecting radar with a capacity to optimize, itself and automatically, the optimum navigation law to be followed, by virtue of the analysis in real time of its environment and knowledge of the operational requirements. In a first phase 1, the environment is therefore analysed in order to deduce therefrom characteristics of the sea clutter. Next, the coherent or non-coherent detection mode is used. In a second phase 2, the radar proposes to the operator an optimal path for the carrier depending on the mission and the environment. These phases 1, 2 are repeated throughout the mission.

The main advantages are in particular the following:

The path of the carrier thus proposed optimizes the detection capacities of the radar;

Operator training is de-skilled and simplified;

The level of expertise required by operators is decreased;

The amount of stress on operators during their mission is decreased and they can thus concentrate on their mission as navigational choices require less effort.

Another advantage of the invention is that it does not require characteristics of the environment to be known beforehand.

The invention claimed is:

1. A method for optimizing the detection of marine targets by an airborne radar integrated into a carrier, comprising:
a first phase of analysing, learning and refreshing an environment, in which one or more-elements of influence on a sea clutter perceived by the radar are sought and stored in memory;
a second phase of updating a path to be followed by said carrier depending on one or more mission requirements and said one or more-elements of influence issued from a result of said first phase, said path to be followed decreasing a power of a signal backscattered by the sea clutter received by the radar when an antenna is pointing towards a search zone liable to contain a target;
said first and second phases being repeated; the one or more elements of influence comprising a direction in which the antenna of said radar is pointing with respect to a wind direction, said wind direction is determined by detecting a direction in which the power of the signal backscattered by the sea clutter is maximum during said first phase of analysing the environment.

2. The method according to claim 1, wherein said first phase is performed in each scanning cycle, said second updating phase also being performed in each scanning cycle.

3. The method according to claim 1, wherein an element of influence being the direction in which the antenna of said radar is pointing with respect to the wind direction, and a detection mode being non-coherent, said path to be followed depends on said element of influence and whether said search zone, with respect to the course of the carrier, is located in front, to the rear or perpendicularly.

4. The method according to claim 1, wherein the one or more elements of influence comprising a clutter-to-noise ratio and, a detection mode being non-coherent, said path to be followed depends on said ratio, said path being deviated to another course when said ratio exceeds a given threshold.

5. The method according to claim 1, wherein the one or more elements of influence comprise a bearing of the antenna and the direction in which the antenna of said radar is pointing with respect to the wind direction, and a detection mode being coherent, said path to be followed is perpendicular to the wind direction in the case where a target assumed to be mobile is detected, and parallel to the wind direction in the case where a target assumed to be immobile is detected.

6. The method according to claim 1, wherein, after said phase of analysing the environment, the processing means update and store in memory a map of the wind, the updated path to be followed also being stored in memory.

7. The method according to claim 1, wherein said path to be followed, updated, is transmitted to an operator by said radar via suitable means.

8. The method according to claim 1, executed in a maritime patrol mission or maritime surveillance mission.

9. The method according to claim 1, is executed in a sea rescue mission.

10. A radar, configured to implement the method according to claim 1.

* * * * *

UNITED STATES PATENT AND TRADEMARK OFFICE
CERTIFICATE OF CORRECTION

PATENT NO. : 10,422,858 B2
APPLICATION NO. : 15/491871
DATED : September 24, 2019
INVENTOR(S) : Vincent Corretja et al.

Page 1 of 1

It is certified that error appears in the above-identified patent and that said Letters Patent is hereby corrected as shown below:

In the Claims

In Claim 2, Column 9, Line 34, "wherein said first phase" should be -- wherein said first analysing phase --.
In Claim 9, Column 10, Line 31, "to Claim 1, is executed in a sea" should be -- to Claim 1, executed in a sea --.

Signed and Sealed this
Twenty-fourth Day of December, 2019

Andrei Iancu
*Director of the United States Patent and Trademark Office*